Oct. 16, 1956  G. E. HENNING  2,766,479
APPARATUS FOR EXTRUDING CELLULAR PLASTICS
Filed Aug. 28, 1952

INVENTOR
G. E. HENNING
BY [signature]
ATTORNEY

United States Patent Office 2,766,479
Patented Oct. 16, 1956

2,766,479

APPARATUS FOR EXTRUDING CELLULAR PLASTICS

George E. Henning, Baltimore, Md., assignor to Western Electric Company, Incorporated, New York, N. Y., a corporation of New York Application August 28, 1952, Serial No. 306,823

2 Claims. (Cl. 18—13)

This invention relates to apparatus for extruding plastics, and more particularly to apparatus for extruding coverings of cellular plastics upon filamentary conductors.

The extruders used commercially to form insulating plastic coverings upon filamentary conductive cores are of the cross-head type. Such extruders include a stock screw rotatably mounted within a cylindrical bore for forcing a plastic compound from an entrance end of the bore to a delivery end thereof, and means for advancing a filamentary conductor through a head mounted at the delivery end of the bore. The head is provided with an extrusion die mounted in axial alignment with and spaced from a core tube for guiding the advancing conductor into and through the die.

Extruders of the cross-head type inherently present the problem of compensating for unbalanced flow conditions caused by the 90° bend in the flow of the plastic compound. This unbalanced flow frequently causes a lack of concentricity between the sheath and the core of the extruded product. The obvious result of a lack of concentricity is a variation in the wall thickness of the insulation on the conductor. Since rigid specifications established for the communications industry require the physical and electrical characteristics at all points along an insulated conductor to be uniform within narrow limits of tolerance, the concentricity of the insulated conductor must be closely controlled.

The existence of unbalanced flow conditions within an extruder creates even greater problems when the plastic insulation extruded onto the conductor is cellular in nature. In the manufacture of conductors insulated by a cellular form of a plastic, such as cellular polyethylene, solid polymers of ethylene mixed with a heat decomposable blowing agent may be continuously extruded onto a conductor moving through an extrusion die. The extrusion temperature should be so controlled that as the tubular sheath of polyethylene issues from the die, the gas evolved by heat decomposition of the blowing agent expands the sheath into a cellular form containing a multiplicity of minute, blown cells uniformly distributed throughout the sheath.

In order to prevent premature gas expansion within the confines of the extruder, it is important that temperatures within the extruder and the die should be accurately regulated and that the rate of extrusion and the linear speed of the conductive core be adjusted suitably. Furthermore, some blowing agents decompose within a rather narrow temperature range, and their decomposition temperature may be affected by the presence of other ingredients in the plastic compound. Under such circumstances, it is necessary to seek suitable means for rendering the extrusion of expanded plastics less critical with respect to temperature and ingredients. This may be accomplished by creating a back pressure within the extruder to prevent premature expansion of the gas therein.

An object of the invention is to provide new and improved apparatus for extruding plastics.

Another object of the invention is to provide new and improved apparatus for extruding coverings of cellular plastics upon filamentary conductors.

An apparatus illustrating certain features of the invention may include an extrusion head having a passageway extending therethrough, an extrusion die mounted at one end of the passageway, a perforated plug mounted in the passageway adjacent to the die for restricting the flow of plastic compound to create a back pressure within the passageway, and means for forcing such a plastic compound through the passageway, the perforation and the die.

A clear understanding of the invention may be obtained from the following detailed description in conjunction with the accompanying drawing, in which.

Figure 1:
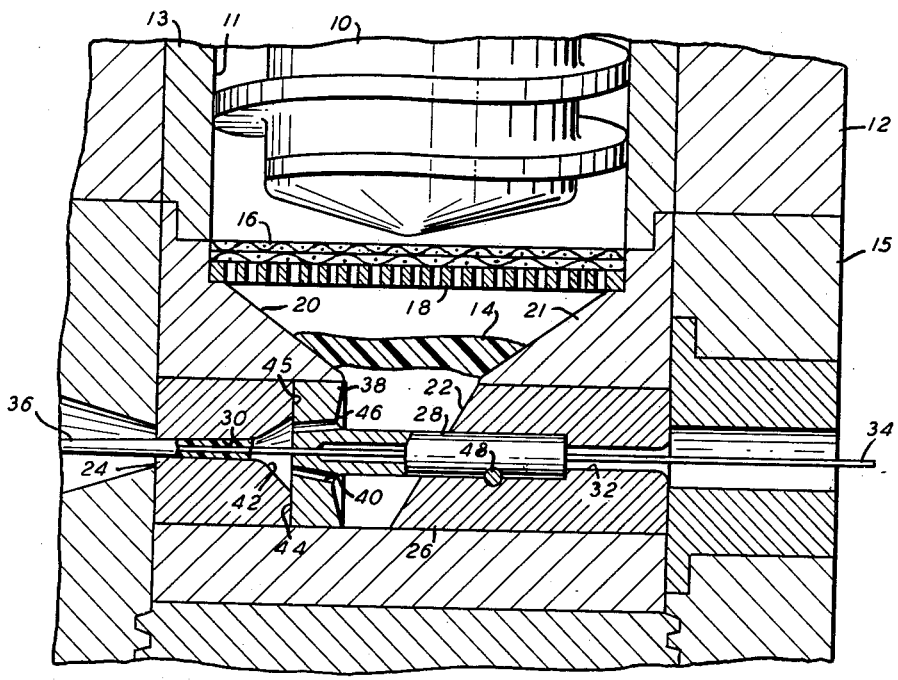
Fig. 1 is a fragmentary, horizontal section of apparatus forming one embodiment of the invention.

The extruder illustrated in Fig. 1 is of the cross-head type, modified in accordance with the invention. It includes a stock screw 10 disposed longitudinally for rotation within a cylindrical bore 11 of an extrusion cylinder 12 having a liner 13. Means (not shown) is provided for positively rotating the stock screw to knead and advance a mass 14 of a plastic compound toward a delivery end of the extrusion bore 11, where an extrusion head 15 is secured. The plastic compound fed into the bore 11 may be a mixture of granular polyethylene and a heat decomposable blowing agent, such as dinitroso pentamethylene tetramine.

Figure 2:
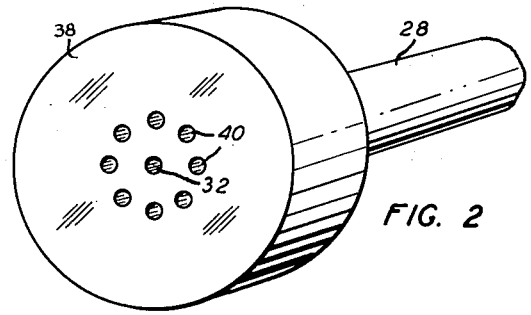
Fig. 2 is an enlarged perspective view of a portion of the apparatus shown in Fig. 1.

A straining screen 16 supported upon a backing plate 18 is mounted transversely across the delivery end of the extrusion bore 11. The screen 16 functions to strain out any lumps or foreign particles in the compound, and it also serves to knead the compound further. After passing through the straining screen 16 and the backing plate 18, the mass 14 of the plastic compound enters a tapered passageway 20 formed in a cylindrical, centrally apertured block 21. The passageway 20 diminishes gradually in cross-section as it leads from the extrusion bore 11 to a chamber 22 formed internally of the block 21. An extrusion die 24 is mounted at the left hand end of the chamber 22, as seen in Fig. 1, and a core tube holder 26 is mounted at the right hand end thereof. A core tube 28 is mounted in the holder 26 in axial alignment with a central aperture 30 which extends through the die 24. The core tube 28 is provided with an axial passageway 32 (Fig. 2) through which a filamentary conductive core 34, such as a copper-clad steel wire, may be advanced continuously, from right to left as viewed in Fig. 1. The core tube 28 guides the continuously advancing core 34 so that it will pass through the axial center of the aperture 30 in the die 24. Within the die, the mass 14 of plastic compound is formed into a tubular sheath surrounding the advancing core 34, resulting in an insulated conductor 36. Beyond the die 24, the insulated conductor 36 is advanced through cooling means (not shown) and thence about a capstan (not shown) which provides the pulling force needed to advance the core 34 through the extruder.

A primary feature of the invention is the provision of a cylindrical flange 38 formed or integrally mounted on the free end of the core tube 28. The axial passageway 32 which extends through core tube 28 continues on through the center of the flange 38. Also extending through this flange in the same general direction as the passageway 32 are a plurality of perforations 40—40, which are equidistantly spaced radially about the central passageway 32. The perforations 40—40 lead from the chamber 22 into a flared entrance 42 of the aperture 30 which extends axially through the die 24. The flared entrance 42 is conical in shape, diminishing gradually in cross-section as it leads from the entrance end of the die 24 into the aperture 30. The rest of the aperture 30 may be slightly conical, gradually diminishing slightly in cross-section towards the exit end of the die 24, as is illustrated in Fig. 1, or this aperture may be perfectly cylindrical.

The cylindrical flange 38 is provided with a transversely flat face 44 which abuts a correspondingly flat face 45 of the entrance end of the die 24. The opposite face of the flange 38 is provided with a frustoconical dished-out portion 46 which directs the flow of the plastic compound into the perforations 40—40. These perforations may lie about half way between the axial passageway 32 and the outer peripheral edge of the flange 38. The perforations 40—40 may begin in the deepest part of the dished-out portion 46, leading smoothly from the outer peripheral portion of the core tube 28 that extends through the chamber 22, and as they lead into the flared entrance 42 the perforations may converge slightly towards the axial passageway 32.

The core tube 28 together with its integral flange 38 is held in position in the core tube holder 26 by means of a pin 48, and the cylindrical flange 38 completely occupies the end of the chamber 22 abutting against the die 24. The pressure of the plastic compound being advanced by the stock screw 10 urges the flange 38 into abutting contact with the die 24 with great force. The die 24, the cylindrical flange 38, and the adjacent portions of the extrusion head 15 are machined accurately so that these parts fit tightly together. The action of forcing the flange tightly against the die may then form a tight seal at this end of the chamber 22.

The face of the core tube holder 26 that forms the right hand boundary of the chamber 22 is shown in Fig. 1 to be inclined with respect to the transversely flat face 44 of the cylindrical flange 38 positioned at the opposite end of the chamber 22. The inclined end face of the core tube holder 26 causes the movement of the mass 14 of plastic compound to be directed toward the flange 38 and the die 24. This effect occurs primarily in the portion of the chamber 22 that is most distant from the stock screw 10. However, in some cases it may be unnecessary to have this end face of core tube holder 26 inclined to the extent illustrated in Fig. 1, and this face may be more nearly parallel to the transversely flat face 44 of the flange 38.

A considerable back pressure is built up within the extrusion head 15 by blocking the exit end of the chamber 22 with the cylindrincal flange 38, so that all of the advancing plastic compound must flow through the perforations 40—40 in the flange to escape from this chamber. This effect is dependent upon the dimensional characteristics of the perforations. The rate of flow of a plastic through a perforation is directly proportional to the fourth power of the diameter of the perforation and inversely proportional to the length of the perforation. Thus, in a long perforation the cumulative effect of the frictional resistance presented by the circular wall of the perforation reduces the rate of flow through the perforation by an amount proportional to its length. Consequently, the rate of flow through a short perforation of small diameter may be equal to the rate of flow through a much longer perforation of somewhat larger diameter. Keeping these relationships in mind, core tubes of different sizes can be designed having perforations in their cylindrical flanges which result in the desired rate of flow for a plastic compound through a particular extruder.

As a rule, the stock screw may be any one of three standard sizes, in which the screw may have a diameter of 2 inches, 3¼ inches or 4½ inches. The pitch of the threads on the stock screw may be relatively long so as to cause the plastic compound to be advanced rapidly through the extrusion bore, or the threads may have a shorter pitch which advances the plastic compound less rapidly, but kneads the compound and builds up a high pressure therein. It is evident that the rate of delivery of the extruded product, as well as the degree of throttling required of the perforated flange on the core tube, are integrally related to the type of stock screw selected. From about 20 up to about 60 pounds per hour of cellular polyethylene may be delivered by extruders having such stock screws.

The rate at which a filamentary core may be advanced through an extruder is determined largely by the wall thickness of the sheath of insulation extruded thereon. Using filamentary cores having diameters ranging from about .016 inch up to about .051 inch to produce cellular polyethylene insulated conductors having outside diameters ranging from about .031 inch up to about .300 inch, the cores may be advanced through the extruders at speeds ranging from about 50 feet per minute to about 1,000 feet per minute.

In further detail, in the extrusion of a sheath of cellular polyethylene upon a filamentary conductive core, a blowing agent, such as a powdered form of dinitroso pentamethylene tetramine, may be uniformly distributed upon granules of the comercially available polymers of ethylene which are to be extruded. At the die a temperature of about 385° F. to about 450° F. is maintained to facilitate continuous extrusion of the polymer and to insure the formation of gas by decomposition of the moving core blowing agent. A convenient length of the moving core may be preheated prior to its entry into the extruder, in order to prevent the conductive core from chilling the extruded mass and thereby inhibiting the action of the blowing agent. The extruded layer of insulation expands after leaving the extrusion die, due to the decomposition of the blowing agent, which forms minute, uniformly distributed, discrete, gas filled cells throughout the polyethylene sheath. The extruded product formed in this manner is characterized by uniformity in size, composition and electrical properties.

The back pressure built up within the extrusion head controls the expansion of the plastic compound that is caused by heat-decomposition of the blowing agent therein. Dinitroso pentamethylene tetramine, the preferred blowing agent, decomposes within a narrow temperature range near 400° F. This decomposition temperature is sufficiently far above the temperature at which the polyethylene softens to make it possible to use this blowing agent without danger of premature decomposition under ordinary operating conditions. However, the presence of other ingredients, such as certain pigments, in the plastic compound may cause this blowing agent to decompose at slightly different temperatures. In order to insure against premature expansion of the blowing agent within the extruder, a high back pressure is built up in the flowing plastic prior to the instant the plastic flows onto the advancing filamentary core being sheathed. This is accomplished by providing flow-restricting perforations, such as the perforations 40—40, in the cylindrical flange 38 mounted on the left hand end of the core tube 28.

A typical core tube which may be used in the extruders described hereinabove may have a diameter of 9/16 inch and the cylindrical flange on the end of the core tube may have a diameter of about one inch and be provided with eight cylindrical perforations, each having a radius of about 1/32 inch and a length of about ¼ inch. It is preferable in most cases to have a larger number of perforations of a smaller radius than those specified in this typical example. Using a stock screw having a diameter of about 3¼ inches to extrude an expanded polyethylene compound onto a filamentary core having a diameter ranging from about .016 inch up to about .051 inch being advanced through a die orifice having a minimum diameter ranging from about .019 inch up to about .093 inch, a pressure head of as much as 6,000 pounds per square inch may be built up behind the cylindrical flange 38 on the left hand end of the core tube. This high pressure head makes it possible for the plastic compound within the extruder to be heated to a temperature appreciably above the temperature at which the blowing agent would ordinarily decompose, without evolving any cells prior to the time the plastic compound flows past the tip of the core tube.

The pressure head will be high in the extrusion bore 11, in the chamber 22, and in the tapered passageway 20 which leads from the extrusion bore to this chamber. Then the static pressure will fall as the plastic compound is forced at higher velocity through the limited passageways provided by the perforations 40—40. A second zone of high pressure, but of much lower pressure than that in the first high pressure zone, may be created within the flared entrance 42 of the aperture 30 as the plastic compound flows into this large entrance from the small perforations. The pressure in the flowing compound remains relatively high until the sheathed core emerges from the exit end of the die, whereupon the sheath may expand due to release of the pressure confining the gas evolved by decomposition of the blowing agent, and allow the sheath to expand rapidly into a cellular form producing the resultant insulated conductor 36.

This arrangement of small perforations extending through the flanged end of the core tube causes the flowing plastic compound to break up into a plurality of thin streams of equal size uniformly distributed circumferentially of the advancing filamentary core 34. These thin streams converge beyond the flanged end of the core tube, impinge upon the advancing core, and are shaped by the die into a unitary tubular sheath covering the core. The result of this arrangement is that the sheath is expanded uniformly into its cellular form, the cells in all portions of the expanded sheath being of approximately equal size.

If the flow of the plastic compound were not retarded to build up a high back pressure by this arrangement of the die and the perforated flange on the core tube, and if the flow of the plastic compound were not divided into a plurality of thin streams equally spaced circumferentially of the advancing core, the expansion of the extruded sheath might occur unevenly, with blown cells of a distinctly larger size appearing in some portions of the sheath. According to the invention, the blowing agent should decompose within the confines of the extruder, but the high pressure head will prevent the evolved gas from expanding by forcing the released gas to dissolve in and permeate the plastic compound without creating cells therein until after the pressure has fallen which condition cannot occur until after the plastic compound has issued from the die.

Figure 3:
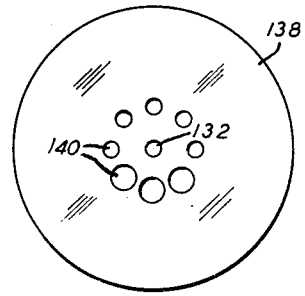
Fig. 3 is an end view of a modified form of the portion of the apparatus shown in Fig. 2.

Fig. 3 illustrates a modified core tube structure in which compensation is provided for the bend of 90° through which a plastic compound must flow in passing through an extruder of the cross-head type similar to the extruder illustrated in Fig. 1. A core tube (not shown) similar to the core tube 28 may be provided with a cylindrical flange 138 at one end thereof. A central passageway 132 extends axially through the flange and the core tube. Through this passageway, a filamentary core, similar to the core 34, may be advanced continuously. The flange 138 is provided with a plurality of perforations 140—140 equally spaced radially about the passageway 132, which perforations are identical with the perforations 40—40 in the flange 38, except that the perforations 140—140 on the side of the flange 138 furthest removed from the stock screw have a larger diameter than the perforations on the side nearest the stock screw. The portion of the plastic compound that travels the longest path in advancing from the stock screw through the die moves through a quadrant of the chamber of the head having a plurality of passageways of larger cross-sectional area than the passageways in the other quadrants of the extrusion orifice.

The passageways of larger cross-sectional area must be on the side of the core tube that is opposite the side on which the stock screw is mounted. Ordinarily the rate of flow of the plastic compound would be lowest in the area most distant from the stock screw, but by enlarging the cross-sectional area of the passageway through this quadrant, the rate of flow in this quadrant is raised. This arrangement may be used to equalize the rates of flow existing in the plastic compound circumferentially of the tip of the core tube. This modification of the apparatus is most effective to correct any lack of concentricity that may occur between the core and the extruded sheath of an insulated conductor. No change need be made in methods described above when this modification of the apparatus is used to carry out such methods.

In the expanded polyethylene sheath the percentage of occluded gas may vary from about 25% up to about 75% by volume. A value of approximately 50% by volume of gas is considered very desirable. When this percentage of gas is trapped within a multiplicity of minute, uniformly distributed cells in the extruded sheath, the dielectric constant of the cellular insulation has a value of about 1.63, in comparison with a value of 2.26 for insulation composed of solid polyethylene. The preferred gas content is about 58%, for which the value of the dielectric constant is 1.53.

A polyethylene compound prepared for extrusion may contain about 3% by weight of blowing agent, when the blowing agent is dinitroso pentamethylene tetramine and when the expanded insulation produced contains about 50% by volume of occluded gas. The amount of blowing agent incorporated may be increased up to about 7% by weight, when it is desired to produce a sheath having a larger percentage of gas therein. Smaller amounts of the blowing agent may be used, if desired.

Other blowing agents, such as diazoamino benzene, may be substituted for the dinitroso pentamethylene tetramine specified in the foregoing description.

What is claimed is:

1. In an apparatus for extruding an insulating sheath composed of a cellular plastic compound upon a filamentary conductive core including a stock screw mounted rotatably within a cylindrical bore for advancing a plastic compound containing an expanding agent, an extrusion head having a chamber therein mounted transversely across the delivery end of the bore and an extrusion die mounted at one end of the chamber, the improvement which comprises a core tube mounted in the chamber in axial alignment with the die for guiding an advancing core into the die, a flow restricting member surrounding the core tube and abutting the die while blocking and occupying substantially all of the portion of the chamber adjacent to the die, said flow restricting member having a plurality of fine, generally longitudinal perforations therethrough which provide the sole paths through which the plastic compound may flow into the die, said perforations being spaced equally about and extending obliquely with respect to the axis of said flow restricting member so as to split the flowing plastic compound into a plurality of fine streams which are directed towards and impinge upon such a core as it advances through the die, said perforations being sufficient in number, of such length and of such restricted cross section that the frictional resistance offered thereby to the flow of such a plastic compound therethrough creates a back pressure within the chamber just in advance of the die of sufficient magnitude to prevent the blowing agent from expanding the plastic compound before it issues from the die.

2. In an apparatus for extruding an insulating sheath composed of a cellular plastic compound upon a filamentary conductive core including a stock screw mounted rotatably within a cylindrical bore for advancing a plastic compound containing an expanding agent, an extrusion head having a chamber therein mounted transversely across the delivery end of the bore and an extrusion die mounted at one end of the chamber, the improvement which comprises a core tube mounted in the chamber in axial alignment with the die for guiding an advancing core into the die and having one end thereof provided with an enlarged cylindrical flange which abuts the die while blocking and occupying substantially all of the portion of the chamber adjacent to the die, said flange having a plurality of fine, generally longitudinal perforations therethrough which provide the sole paths through which the plastic compound may flow into the die, said perforations being spaced equally about and extending obliquely with respect to the axis of the flange so as to split the flowing plastic compound into a plurality of fine streams which are directed towards and impinge upon such a core as it advances through the die, said perforations being sufficient in number, of such length and of such restricted cross section that the frictional resistance offered thereby to the flow of such a plastic comopund therethrough creates a back pressure within the chamber just in advance of the die of sufficient magnitude to prevent the blowing agent from expanding the plastic compound before it issues from the die.

References Cited in the file of this patent

UNITED STATES PATENTS

| | | |
|---|---|---|
| 368,591 | Jones et al. | Aug. 23, 1887 |
| 2,345,086 | Becker et al. | Mar. 28, 1944 |
| 2,354,260 | Haney et al. | July 25, 1944 |
| 2,371,679 | Deitz | Mar. 20, 1945 |
| 2,401,551 | Cook | June 4, 1946 |
| 2,593,198 | Rutherford | Apr. 15, 1952 |
| 2,636,218 | Orsini | Apr. 28, 1953 |

FOREIGN PATENTS

| | | |
|---|---|---|
| 618/1951 | Japan | Jan. 29, 1951 |
| 624,699 | Great Britain | June 15, 1949 |
| 883,883 | France | July 22, 1943 |
| 938,214 | France | Sept. 8, 1948 |